(12) United States Patent
Lee et al.

(10) Patent No.: US 7,228,158 B2
(45) Date of Patent: Jun. 5, 2007

(54) PORTABLE TERMINAL CAPABLE OF PROVIDING STEREO SOUND

(75) Inventors: Jong-Seong Lee, Seoul (KR);
Chang-Hwan Hwang, Goyang-si (KR);
Jin-Woo Kim, Gumi-si (KR);
Young-Min Choi, Gumi-si (KR);
Tae-Hwa Moon, Gumi-si (KR)

(73) Assignee: Samsung Electronics Co., Ltd. (KR)

( * ) Notice: Subject to any disclaimer, the term of this patent is extended or adjusted under 35 U.S.C. 154(b) by 356 days.

(21) Appl. No.: 10/706,560

(22) Filed: Nov. 12, 2003

(65) Prior Publication Data
US 2004/0097258 A1    May 20, 2004

(30) Foreign Application Priority Data
Nov. 12, 2002    (KR) ...................... 10-2002-0070005
Nov. 7, 2003    (KR) ...................... 10-2003-0078750

(51) Int. Cl.
*H04M 1/00* (2006.01)
*H04M 9/00* (2006.01)

(52) U.S. Cl. ............................... 455/575.3; 455/569.1; 455/350; 379/433.02; 379/433.13

(58) Field of Classification Search ............ 455/575.3, 455/569.1, 350, 90.1, 90.2, 90.3, 347, 575.1; 379/433.01, 433.02, 433.13, 432, 420.01, 379/420.02
See application file for complete search history.

(56) References Cited
U.S. PATENT DOCUMENTS
4,633,323 A * 12/1986 Haberkern et al. ......... 348/838

5,214,514 A    5/1993    Haberkern (Continued)

FOREIGN PATENT DOCUMENTS
EP    0 898 405    2/1999

(Continued)

*Primary Examiner*—Duc M. Nguyen
(74) *Attorney, Agent, or Firm*—The Farrell Law Firm

(57) ABSTRACT

A portable terminal can provide stereo sound. The portable terminal includes: a phone body having a plurality of keys and a microphone, which are disposed on an inner surface of the phone body; a folder having a main speaker and a main LCD, which are disposed on a inner surface of the folder; a hinge unit including a pair of side hinge arms and a center hinge arm, which enable the folder to be rotated -away from or towards the phone body, the side hinge arms being opposed to each other at one side of the phone body, the center hinge arm being disposed between the side hinge arms; a pair of side speakers provided at the side hinge arms, respectively, the side speakers being oriented in opposite directions along a hinge axis of the portable terminal, so that the side speakers produce sound in opposite directions along the hinge axis; and speaker covers arranged along the hinge axis to cover the side speakers, respectively, each of the speaker covers having at least one opening through which one of the side speakers is exposed, wherein each of the speaker covers is fixed to one of the side hinge arms by a first screw and a second screw, so as to cover an outer surface of said one of the side hinge arms, the first screw being screwed in a direction parallel to the hinge axis, the second screw being screwed into said one of the side hinge arms from an upper end of the hinge body in a direction perpendicular to the hinge axis.

21 Claims, 13 Drawing Sheets

U.S. PATENT DOCUMENTS

| | | | |
|---|---|---|---|
| 6,078,497 A * | 6/2000 | Derocher et al. | 361/683 |
| 6,396,924 B1 * | 5/2002 | Suso et al. | 379/433.13 |
| 6,697,495 B1 * | 2/2004 | Youn | 381/333 |
| 6,865,400 B2 * | 3/2005 | Oh et al. | 455/556.2 |
| 6,872,088 B2 * | 3/2005 | Watanabe | 439/165 |
| 6,952,860 B2 * | 10/2005 | Kawamoto | 16/285 |
| 2002/0042287 A1 | 4/2002 | Asami | |
| 2004/0204194 A1 * | 10/2004 | Akai et al. | 455/575.1 |
| 2004/0248625 A1 * | 12/2004 | Yoshida et al. | 455/575.1 |

FOREIGN PATENT DOCUMENTS

| | | | |
|---|---|---|---|
| JP | 2003-198696 | | 7/2003 |
| KR | 2004042477 | * | 5/2004 |

* cited by examiner

PORTABLE TERMINAL CAPABLE OF PROVIDING STEREO SOUND

PRIORITY

This application claims priority to an application entitled "Portable Terminal Capable of Providing Stereo Sound" filed in the Korean Intellectual Property Office on Nov. 12, 2002 and assigned Ser. No. 2002-70005, and also to an application, filed in the Korean Intellectual Property Office on Nov. 7, 2003 and assigned Ser. No. 2003-78750, the contents of which are incorporated herein by reference.

BACKGROUND OF THE INVENTION

1. Field of the Invention

The present invention relates generally to a portable terminal, and more particularly to a portable terminal, which has at least a pair of speakers to provide stereo sound.

2. Description of the Related Art

In general, "portable terminals" are electronic devices that a user can carry with him/her to perform wireless communication with a desired partner. Conventional portable terminals may be classified into various types based on their appearance, such as bar-type portable terminals, flip-type portable terminals, and folder-type portable terminals. The bar-type portable terminal has a single housing shaped like a bar. The flip-type portable terminal has a flip, which is pivotably mounted to a bar-shaped housing by a hinge unit. The folder-type portable terminal has a folder coupled to a single bar-shaped housing by a hinge unit, thus the folder can be rotated in order to be folded to or unfolded from the housing.

Furthermore, the portable terminals may be classified into necklace-type terminals and wrist-type terminals based on a position at or a way in which the user puts it on the terminal. The necklace-type terminal is one that the user wears around the neck using a string, while the wrist-type terminal is one that is worn around the wrist of the user.

Additionally, the portable terminals may be classified into rotation-type terminals and sliding-type terminals based on ways of opening and closing the terminals. In the rotation-type portable terminal, two housings are coupled to each other in a manner that one housing rotates to be opened or closed relative to the other while facing each other. In the sliding-type portable terminal, two housings are coupled to each other in a manner that one housing slides to be opened or closed relative to the other. The above-described various types of portable terminals are easily understood by those skilled in the art.

Commonly, each of the conventional portable terminals described above is necessarily equipped with an antenna device, a data input/output device, and a data transmission/reception device. As a data input device, a keypad which enables data to be input by pressing with fingers of the user is generally employed, while a touch pad or touch screen is sometimes employed. As a data output device, an LCD is generally employed.

The keypad usually employed for data input has an arrangement of multiple keys including numeric keys, character keys, a SEND key, an END key, and functional keys. Preferably, about 15 to 20 keys, such as those described above, are arranged at preferred locations of an upper surface of a portable terminal. Such keys are exposed on the upper surface of a portable terminal, thus the user can input data by pressing against the keys with fingers of the user. Moreover, the conventional portable communication apparatuses may have a camera lens or a photographing means which enables the user to make an image communication with a desired partner or to take a photograph of a desired subject.

However, since users of the portable terminals have revealed a gradually increasing desire for information, it is in fact inconvenient to use the conventional portable terminals for communication in an Internet environment or multimedia environment. Especially, it is inconvenient for the user to view a video-on-demand or watch television by the conventional portable terminals, in that each of the conventional portable terminals has a single speaker by which the user can listen to the sound.

SUMMARY OF THE INVENTION

Accordingly, the present invention has been made to solve the above-mentioned problems occurring in the prior art, and an object of the present invention is to provide a portable terminal, which has a pair of speakers preferably provided at hinge arms of the portable terminal.

It is another object of the present invention to provide a portable terminal, which has a pair of speakers opposed to each other and disposed along a hinge axis of the portable terminal, thus the portable terminal can provide stereo sound.

In order to accomplish this object, there is provided a portable terminal including: a phone body having a plurality of keys and a microphone, which are disposed on an inner surface of the phone body; a folder having a main speaker and a main LCD, which are disposed on a inner surface of the folder; a hinge unit including a pair of side hinge arms and a center hinge arm, which enable the folder to be rotated away from or towards the phone body, the side hinge arms being opposed to each other at one side of the phone body, the center hinge arm being disposed between the side hinge arms; a pair of side speakers provided at the side hinge arms, respectively, the side speakers being oriented in opposite directions along a hinge axis of the portable terminal, so that the side speakers produce sound in opposite directions along the hinge axis; and speaker covers arranged along the hinge axis and facing the side speakers, respectively, each of the speaker covers having at least one opening through which one of the side speakers is exposed, wherein each of the speaker covers is fixed to one of the side hinge arms by a first screw and a second screw, so as to cover an outer surface of the one of the side hinge arms, the first screw being screwed in a direction parallel to the hinge axis, the second screw being screwed into the one of the side hinge arms from an upper end of the hinge body in a direction perpendicular to the hinge axis.

In accordance with another aspect of the present invention, there is provided a portable terminal including: a phone body having a pair of side hinge arms laterally protruding at one side of the phone body; a folder having a center hinge arm disposed between the side hinge arms; a pair of side speakers provided at the side hinge arms and oriented in opposite directions along the hinge axis of the portable terminal; speaker covers arranged along the hinge axis and facing the side speakers, respectively, each of the speaker covers having at least one opening through which one of the side speakers is exposed; at least one cap covered on the opening of one of the speaker covers and having pores formed through the cap; and a camera lens provided at a location of the center hinge arm, which is adjacent to an outer surface of the folder, wherein each of the speaker covers is fixed to one of the side hinge arms by couplers such as a first screw and a second screw, so as to cover an outer surface of said one of the side hinge arms, the first screw being screwed in a direction parallel to the hinge axis, the second screw being screwed into said one of the side hinge arms from an upper end of the hinge body in a direction perpendicular to the hinge axis.

In accordance with another aspect of the present invention, there is provided a portable terminal including: a phone body having a plurality of keys and a microphone, which are disposed on an inner surface of the phone body; a folder having a main speaker and a main LCD, which are disposed on a inner surface of the folder; a hinge unit connecting the phone body with the folder in such a manner to enable the folder to be rotated away from or towards the phone body; a pair of side speakers installed in a pair of side hinge arms which are formed at opposite ends of one side of the phone body, the side speakers being oriented in opposite directions along a hinge axis of the portable terminal; and a barrier disposed behind the side speakers to prevent sound emitted from the side speakers from interfering with each other.

In accordance with another aspect of the present invention, there is provided a portable terminal including: a phone body having a plurality of keys and a microphone, which are disposed on an inner surface of the phone body; a folder having a main speaker and a main LCD, which are disposed on a inner surface of the folder; a hinge unit connecting the phone body with the folder in such a manner to enable the folder to be rotated away from or towards the phone body; a pair of side speakers installed in a pair of side hinge arms which are formed at opposite ends of one side of the phone body, the side speakers being spaced apart from each other and being oriented in opposite directions along a hinge axis of the portable terminal; and a resonance blocker located between the side speakers to prevent sound emitted from the side speakers from resonating each other.

In accordance with another aspect of the present invention, there is provided a portable terminal including: a phone body having a plurality of keys and a microphone, which are disposed on an inner surface of the phone body; a folder having a main speaker and a main LCD, which are disposed on a inner surface of the folder; a hinge unit connecting the phone body with the folder in such a manner to enable the folder to be rotated away from or towards the phone body; a pair of side speakers installed in a pair of side hinge arms which are formed at opposite ends of one side of the phone body, the side speakers being spaced apart from each other and being oriented in opposite directions along a hinge axis of the portable terminal; and speaker covers assembled with outer surfaces of the side hinge arms and facing the side speakers, respectively, to enable sound emitted from the side speakers to propagate an original tone of the sound.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
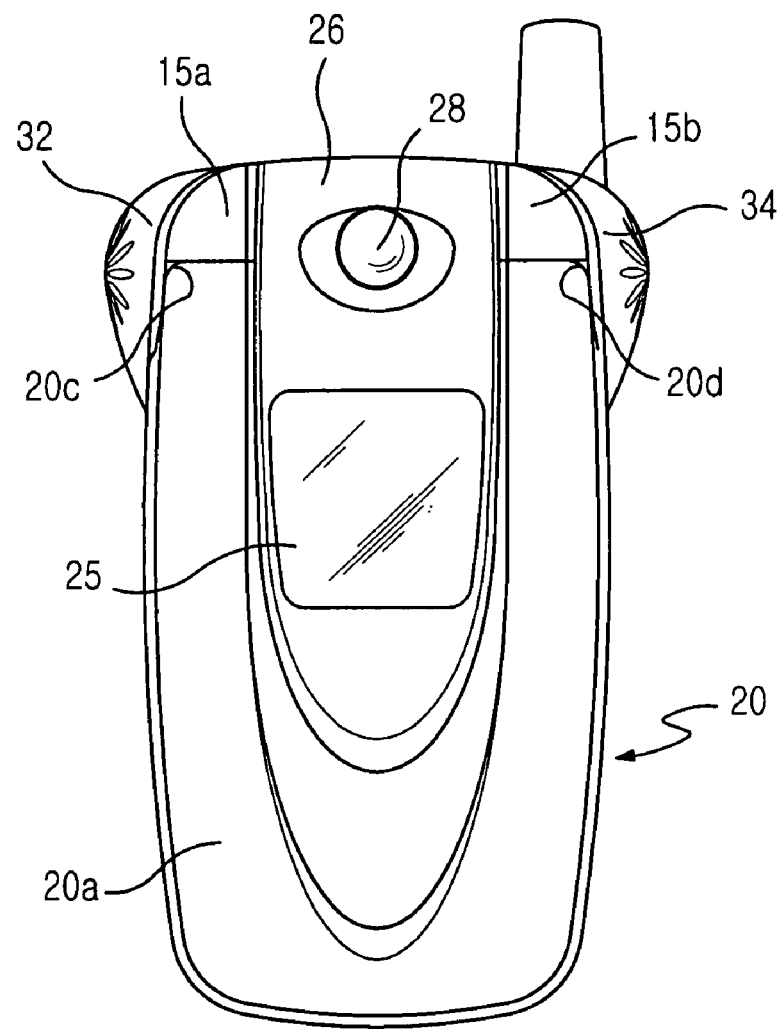
FIG. 1 is a plan view of a portable terminal according to a preferred embodiment of the present invention, in which a folder of the terminal is closed.

Hereinafter, a preferred embodiment of the present invention will be described in detail with reference to the accompanying drawings. In the drawings, the same or similar elements are denoted by the same reference numerals even though they are depicted in different drawings. In the following description of the present invention, a detailed description of known functions and configurations incorporated herein will be omitted for clarity where they are well-known in the art.

As illustrated in FIGS. 1 to 7, a portable terminal according to a preferred embodiment of the present invention includes a pair of speakers S1 and S2 (shown in FIG. 7) and a pair of speaker covers 32 and 34, which are disposed along a hinge axis A (shown in FIG. 2) and opposite to each other. The portable terminal illustrated in the preferred embodiment of the present invention is a folder-type terminal.

Figure 2:
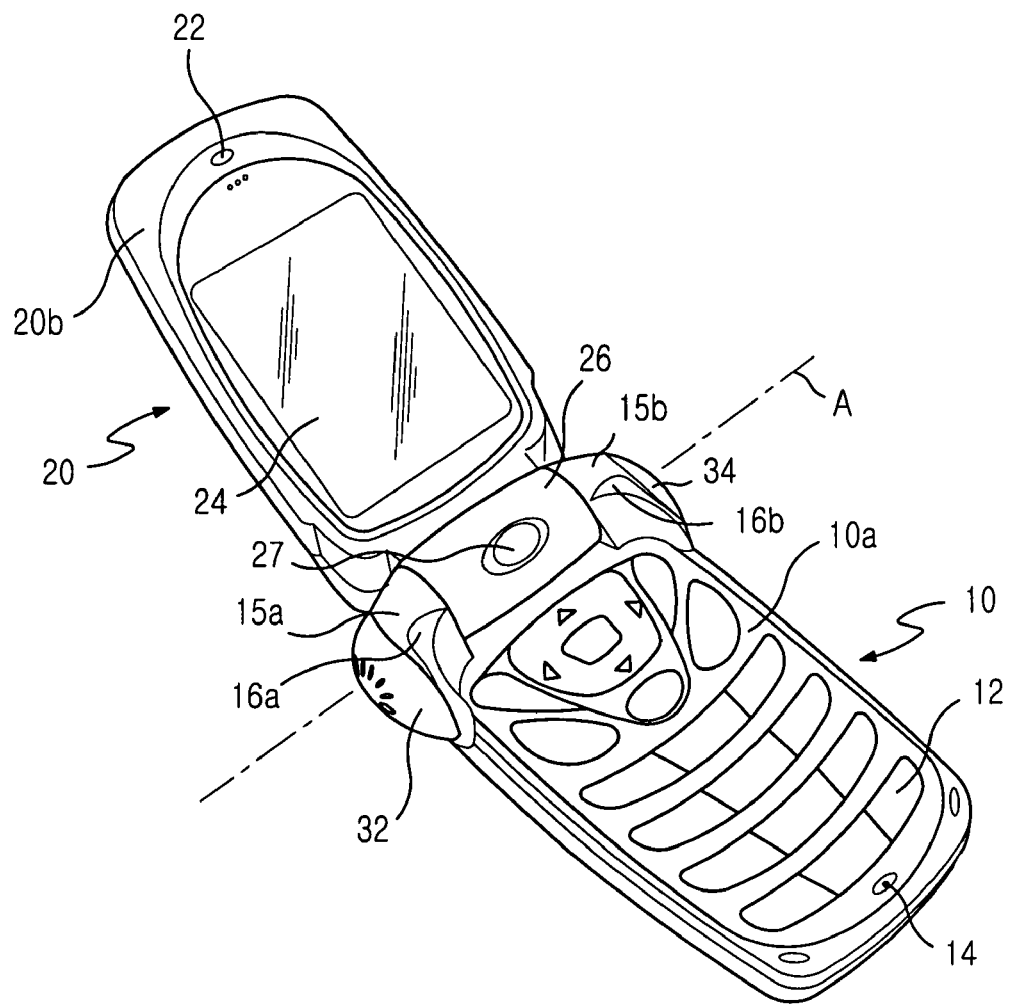
FIG. 2 is a perspective view of a portable terminal according to a preferred embodiment of the present invention, in which a folder of the terminal is open.
Figure 3:
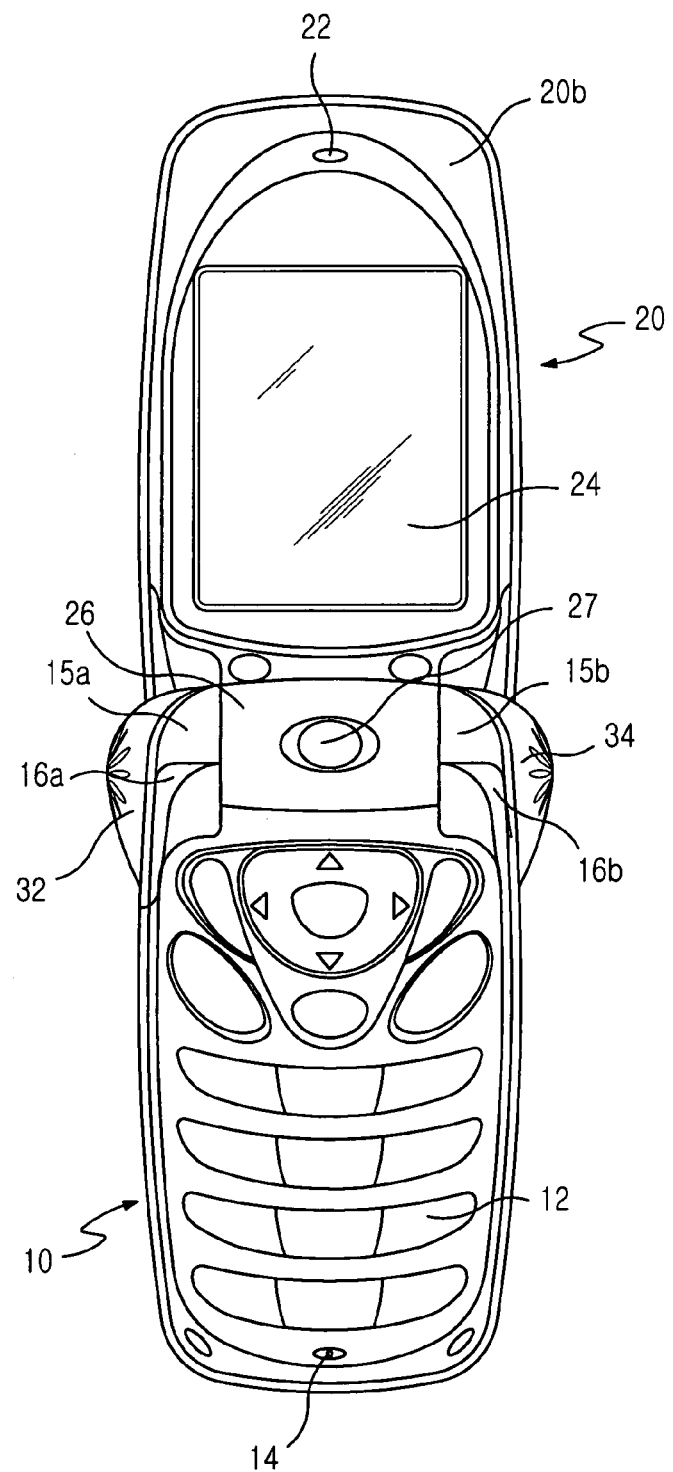
FIG. 3 is a front view of the portable terminal shown in FIG. 2.
Figure 4:
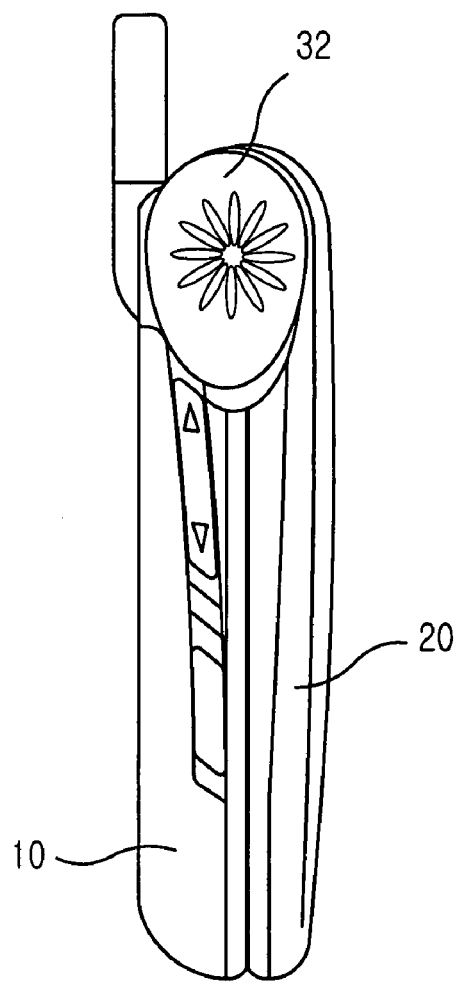
FIG. 4 is a left side view of the portable terminal shown in FIG. 1.
Figure 5:
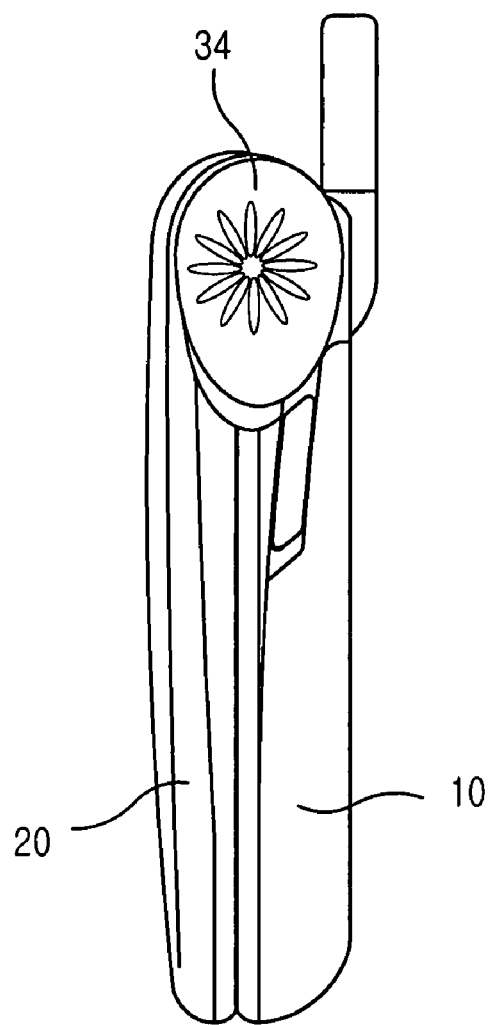
FIG. 5 is a right side view of the portable terminal shown in FIG. 1.
Figure 6:
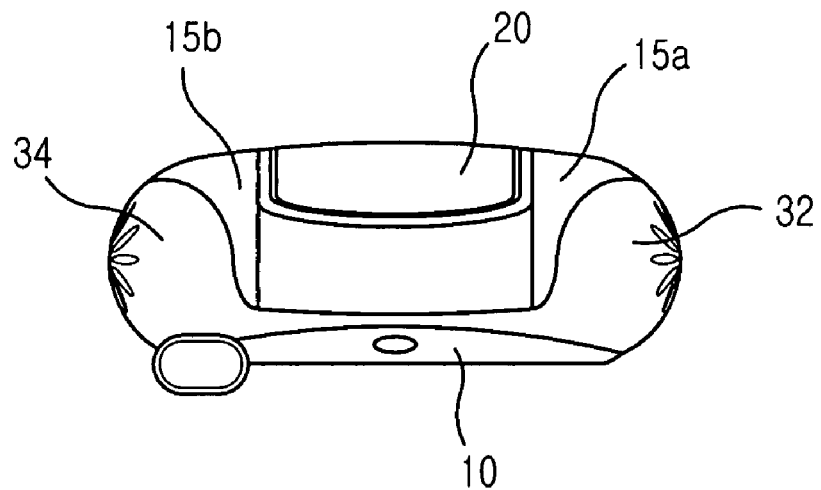
FIG. 6 is a rear view of the portable terminal shown in FIG. 1.

FIG. 2 is a perspective view in which a folder 20 is opened. The folder-type terminal includes a phone body 10, the folder 20, and a hinge unit. The phone body 10 includes a plurality of keys 12 and a microphone 14, which are disposed on an inner surface of the phone body 10. The folder 20 includes a main speaker 22 and a main Liquid Crystal Display (LCD) 24, which are disposed on a inner surface 20b of the folder 20. The hinge unit includes a pair of side hinge arms 15a and 15b and a center hinge arm 26, which enable the folder 20 to be rotated away from or towards the phone body 10. The side hinge arms 15a and 15b are opposed to each other at one side of the phone body 10, and the center hinge arm 26 is disposed between the side hinge arms 15a and 15b.

Figure 7:
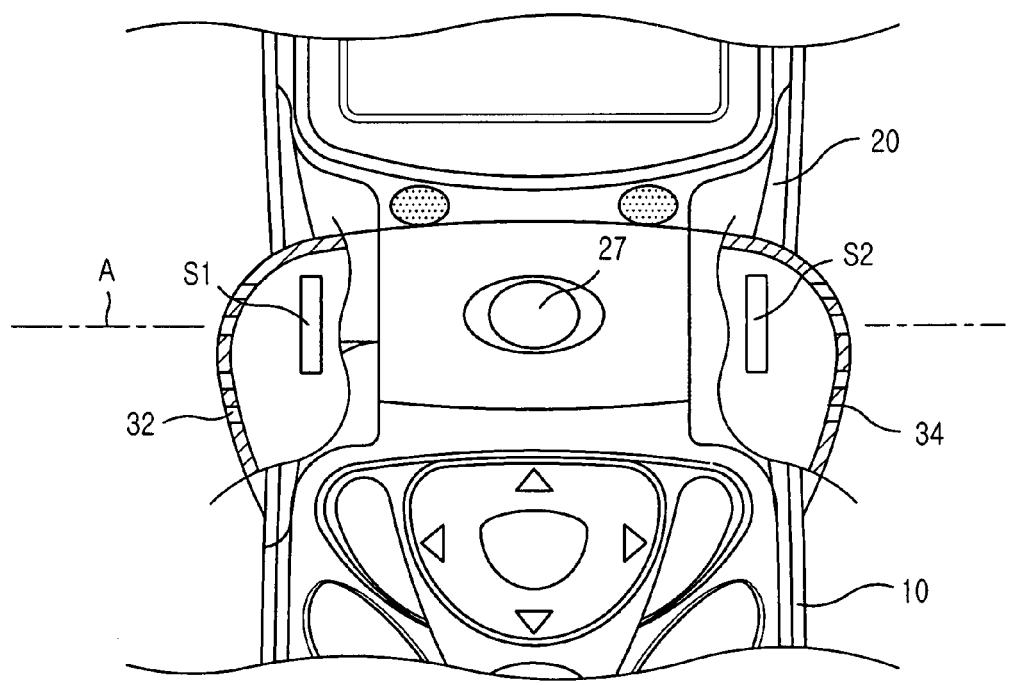
FIG. 7 is an enlarged plan view in partial cut-away illustrating a pair of speaker systems employed in the portable terminal shown in FIG. 2.

FIG. 7 is an enlarged plan view illustrating a pair of speakers employed in the portable terminal. Preferably, the portable terminal according to the present invention further includes a pair of side speakers S1 and S2 which are provided at the side hinge arms 15a and 15b, respectively. The side speakers S1 and S2 are oriented in opposite directions along the hinge axis A, thus the side speakers S1 and S2 produce sounds in opposite directions along the hinge axis A.

Furthermore, the speaker covers 32 and 34 protect the side speakers S1 and S2, respectively, from the outside environment. The speaker covers 32 and 34 are arranged along the hinge axis A and face the speakers S1 and S2, respectively. Moreover, each of the speaker covers 32 and 34 has preferably a convex shape to surround the speakers S1 and S2, respectively.

Referring to FIG. 2 again, the center hinge arm 26 is formed integrally with the folder 20 and has a camera lens 28 (shown in FIG. 1) and a center key 27. The center key 27 is used to switch the portable terminal into a camera operation mode. As shown in FIG. 1, the camera lens 28 is disposed adjacent to a sub LCD 25 on an outer surface 20a of the folder 20, and the center key 27 (shown in FIG. 2) is adjacent to the main LCD 24 on the inner surface 20b of the folder 20.

In addition, the side hinge arms 15a and 15b have grooves 16a and 16b formed on upper surfaces of the side hinge arms 15a and 15b, respectively. Therefore, when the folder 20 has been closed to the phone body 10, corners 20c and 20d of a shoulder of the folder 20 can be seated in the grooves 16a and 16b.

When the portable terminal according to the preferred embodiment of the present invention is in a state as illustrated in FIG. 1, a user can communicate an image with a partner while facing the partner by the camera lens 28 and the sub LCD 25. When the portable terminal according to the preferred embodiment of the present invention is in a state as shown in FIG. 2, a user can either take a photograph of a desired subject by the camera lens 28 and the main LCD 24 or view a picture or movie by means of the main LCD 24 and the side speakers S1 and S2. The user can hear stereo sound through the side speakers S1 and S2.

Hereinafter, a construction for the speakers S1 and S2 will be described in detail with reference to FIGS. 8 to 11.

The speakers S1 and S2 are installed inside of the side hinge arms 15a and 15b of the phone body 10 and are exposed through speaker cover holes 151 formed through side surfaces of the side hinge arms 15a and 15b. Although not shown, the speakers S1 and S2 are supported by ribs, etc., which are formed inside of the side hinge arms 15a and 15b.

In order to protect the speakers S1 and S2, each of the speaker covers 32 and 34 is assembled with the speaker cover holes 151. Each of the speaker covers 32 and 34 has a first opening 321 through which sound output of the speaker S1 or S2 is transferred. In the present embodiment, a cap 40 having pores 41 formed through the cap 40 is assembled with the first opening 321, so as to improve the appearance of the terminal. According to another embodiment of the present invention, each of the speaker covers 32 and 34 may have a solid surface through which pores 41 are formed instead of the first opening 321. In order to assemble the cap 40 with the first opening 321, at least one second opening 322 is formed around the first opening 321 and at least one cap protuberance 43 corresponding to the second opening 322 is formed along a circumference of the cap 40. Further, the cap 40 is made from metal and separably assembled with the speaker cover 32 or 34 according to another embodiment of the present invention, the cap 40 may be preferably made from synthetic resin and fixed to the speaker cover 32 or 34 preferably by ultrasonic fusion, etc.

Figure 13:
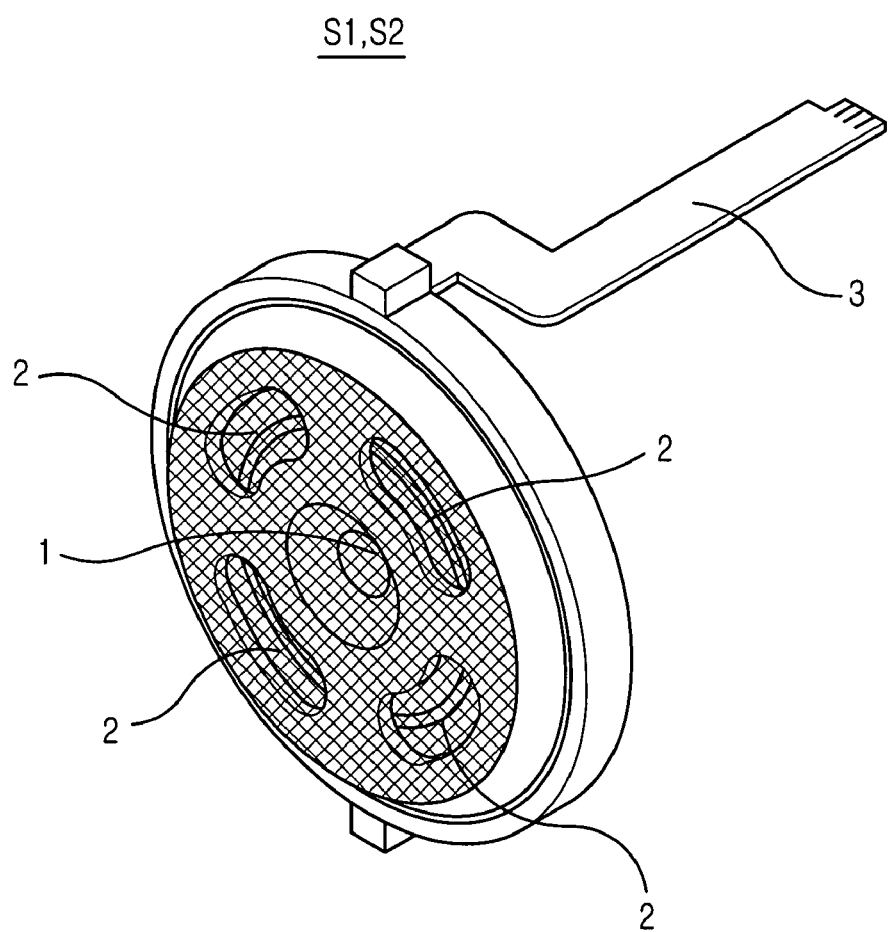
FIG. 13 is an enlarged perspective view illustrating the side speaker of FIG. 8 in more detail.

Referring to FIG. 13, each of the speakers S1 and S2 has a magnet 1 located at the center thereof and a vibrating diaphragm 2 surrounding the magnet 1, thus the magnet 1 can vibrate the vibrating diaphragm 2 to produce sound. Herein, the first opening 321 formed at the center of the speaker cover 32 or 34 is aligned with the center of the speaker S1 or S2 to enable the sound output from the magnet 1 located at the central portion of the speaker S1 or S2 to propagate outward through the first opening 321. Further, at least the one second opening 322 formed around the first opening 321 is aligned with the circumference of the speaker S1 or S2 to enable the sound output from the vibrating diaphragm 2 located at the circumferential portion of the speaker to propagate outward through the second opening 322. The second opening 322 not only enables the cap 40 to be assembled with the speaker cover 32 or the speaker cover 34, but also serves as an auxiliary means for propagating the sound from the speaker S1 or S2 outward. The speaker S1 or S2 of the stereo portable phone according to the present invention includes a speaker cover 32 or 34 through which the first opening 321 and the second opening 322 are formed, that is, a structure which enables the sound produced from the speaker S1 or S2 to propagate according to its property, so as to provide users with an original tone of the sound of the speaker S1 or S2.

Each of the speaker covers 32 and 34 is assembled with the speaker cover hole 151 of the side hinge arm 15a or 15b by an assembling rib 323, a first assembling bracket 325, a first screw hole 328, etc., which are formed inside of each of the speaker covers 32 and 34. At least one assembling rib 323 is formed on a peripheral portion of an inner surface of each of the speaker covers 32 and 34 so that the assembling rib 323 can be in contact with a boundary surface defining the speaker cover hole 151 when each of the speaker covers 32 and 34 is assembled with the speaker cover hole 151. Each assembling rib 323 has at least one stopper hole 324, and at least one stopper 153 is formed at the boundary surface defining the speaker cover hole 151 to be engaged with the assembling rib 323. When the assembling rib 323 contacts with the boundary surface of the speaker cover hole 151, the stopper 153 is engaged with the assembling rib 323 to hold the speaker cover 32 or the speaker cover 34.

An assembling protuberance 327 is formed on the inner surface of each of the speaker covers 32 and 34 and has the first screw hole 328 extending through the assembling protuberance 327 in a direction parallel to the hinge axis A. An assembling bracket (not shown) corresponding to the first screw hole 328 of the assembling protuberance 327 is formed on an inner surface of each of the side hinge arms 15a and 15b so that a first screw 109a can be screwed through the assembling bracket into the first screw hole 328 to assemble the assembling bracket and the first screw hole 328 with each other.

The first assembling bracket 325 extends in a direction parallel to the hinge axis A from the inner surface of each of the speaker covers 32 and 34 and has a first assembling hole 326 formed inside of each of the speaker covers 32 and 34 through the first assembling bracket 325. A second assembling bracket 155 is formed inside of each of the side hinge arms 15a and 15b, so that the second assembling bracket 155 contacts with the first assembling bracket 325 when the speaker cover 32 is assembled with the side hinge arm 15a or when the speaker cover 34 is assembled with the side hinge arm 15b. Further, a second screw hole 157 is formed through a shell of each of the side hinge arms 15a and 15b in a direction perpendicular to the hinge axis A. The first assembling hole 326 formed through the first assembling bracket 325, a second assembling hole 156 formed through the second assembling bracket 155, and the second screw hole 157 are aligned with each other, and a second screw 109b is screwed sequentially through the second screw hole 157, the first assembling hole 326, and the second assembling hole 156 in a direction perpendicular to the hinge axis A, so as to fix the speaker cover 32 to the side hinge arm 15a or the speaker cover 34 to the side hinge arm 15b.

Each of the speaker covers 32 and 34 is first fitted in the speaker cover hole 151 and held by engagement between the stopper 153 and the stopper hole 324 of the assembling rib 323, and is then fixedly assembled with the speaker cover hole 151 of each of the side hinge arms 15a and 15b by the first screw 109a screwed into the assembling protuberance 327 from the inside of the side hinge arm 15a or 15b and the second screw 109b screwed through the first assembling bracket 325 and the second assembling bracket 155 from the upside of the side hinge arm 15a or 15b.

Figure 8:
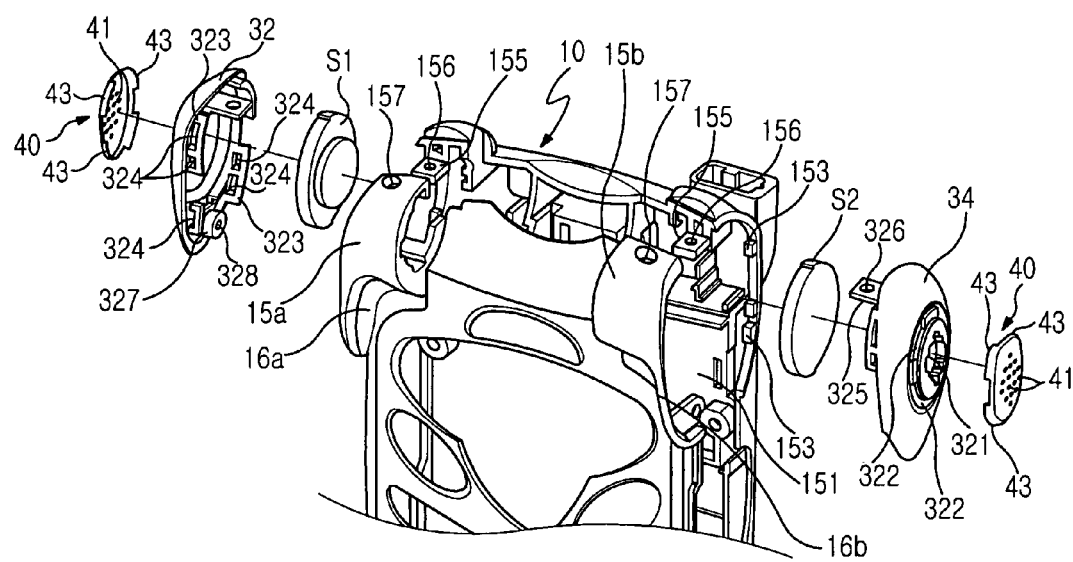
FIG. 8 is an exploded perspective view illustrating the speakers of the portable terminal shown in FIG. 1.
Figure 9:
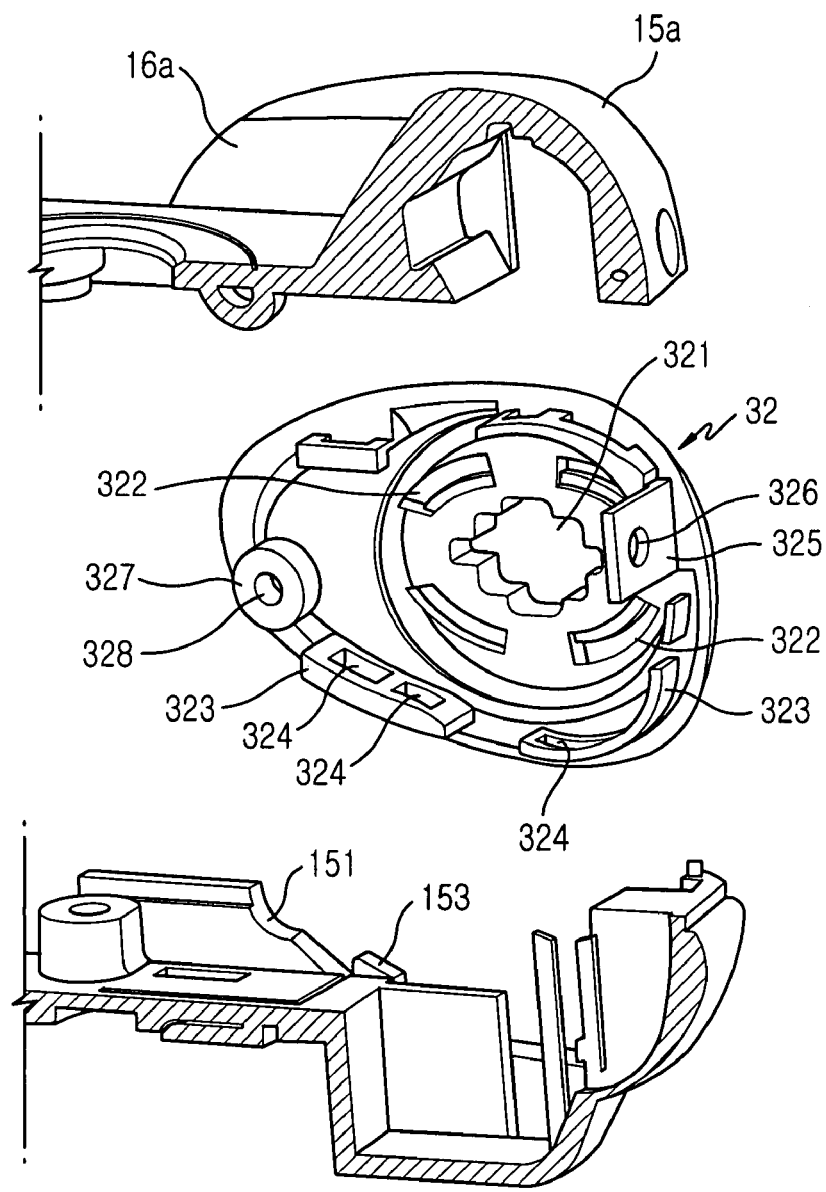
FIG. 9 is an exploded perspective view illustrating assembly of the speaker cover and the side hinge arm shown in FIG. 8.
Figure 10:
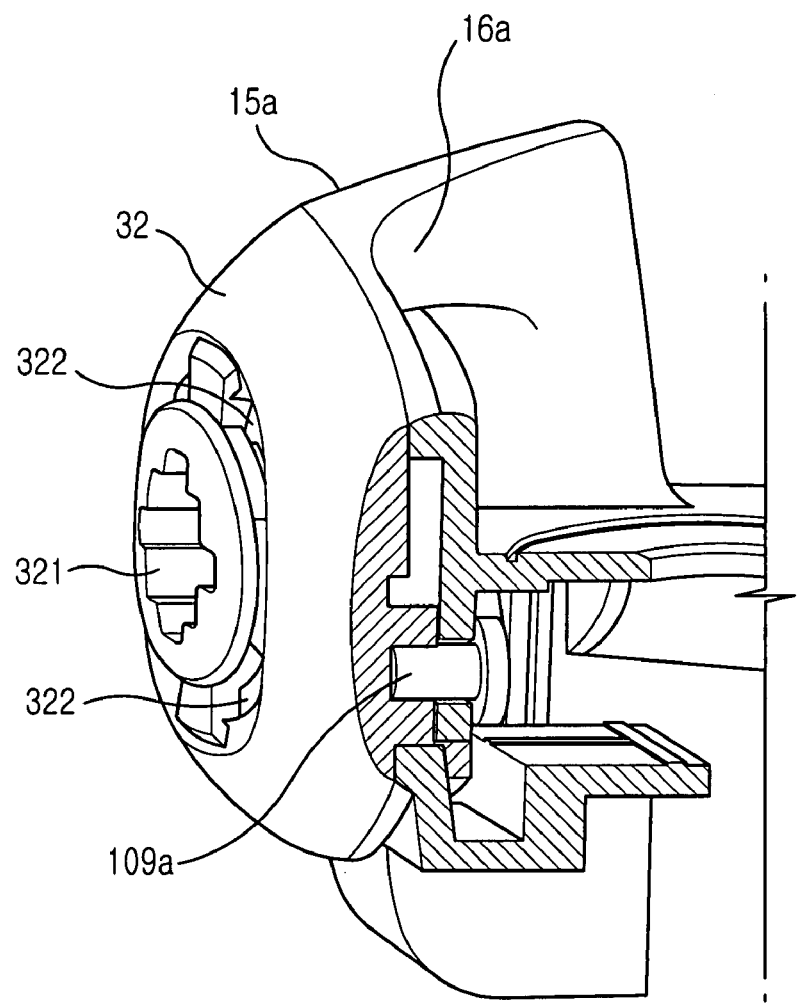
FIGS. 10 and 11 are perspective views illustrating the speaker cover of FIG. 8, which has been assembled with the side hinge arm by screws.
Figure 11:
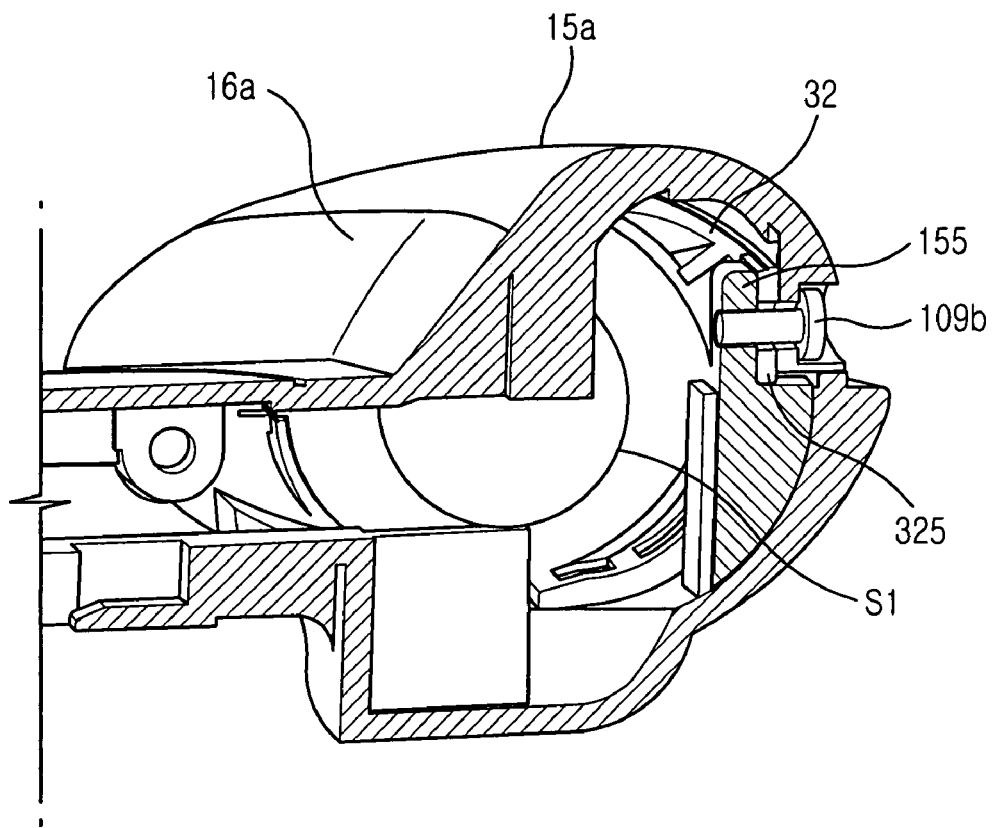
Figure 12:
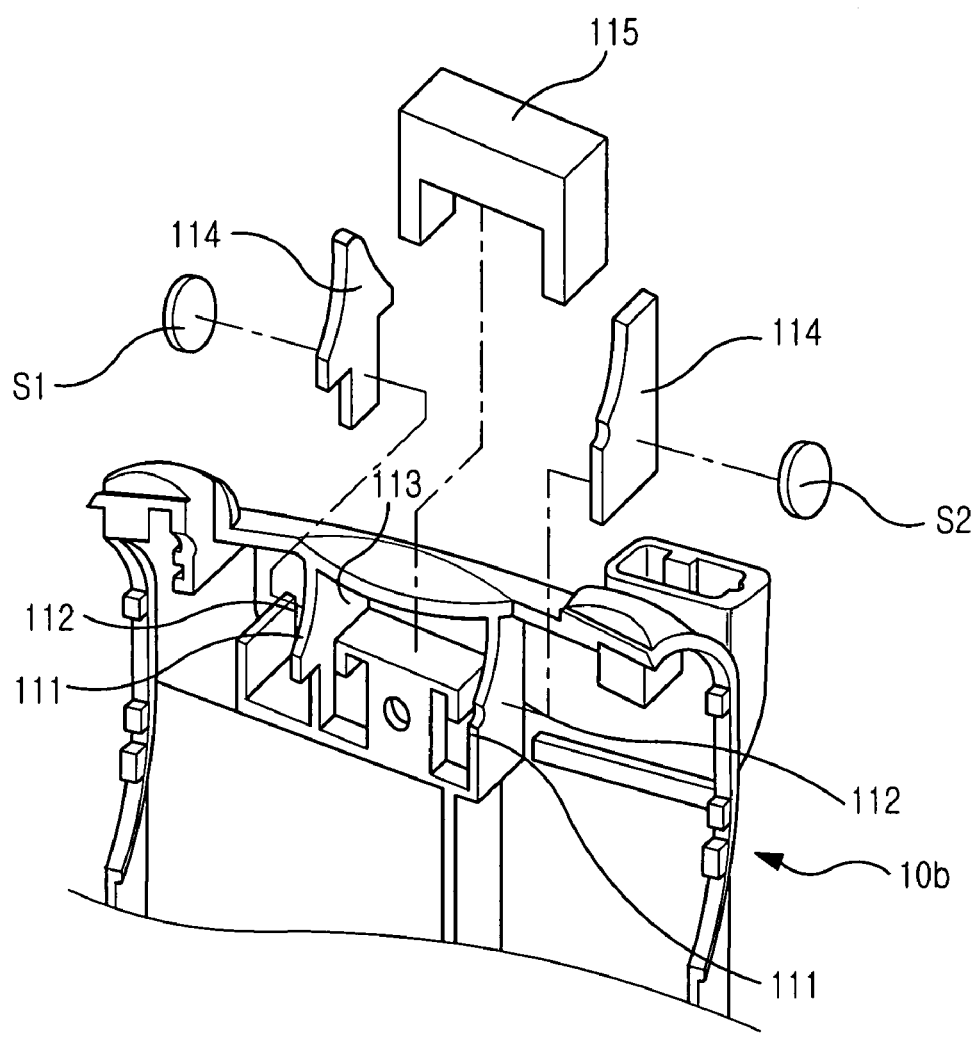
FIG. 12 is an exploded perspective view of a portion of the portable terminal, which illustrates a construction for assembling the stereo speakers shown in FIG. 8 with the phone body.

FIG. 12 is an exploded perspective view of a portion of the portable terminal, which illustrates a construction for assembling the stereo speakers S1 and S2 shown in FIG. 8 with the phone body. When a pair of speakers S1 and S2 are installed in the phone body as described above, the sound produced by the speakers S1 and S2 may interfere or resonate with each other in a space between the speakers S1 and S2 to distort specific tones of the sound outputted from the speakers S1 and S2. Moreover, resonance of the sound, which may happen in the space between the speakers S1 and S2, may vibrate a housing 10b of the portable terminal, etc., thereby generating noise. In order to prevent such interference or resonance of the sound, a barrier such as a partition 111, which can prevent the sound outputted from each speaker from propagating toward the other speaker, is provided between the speakers S1 and S2. Further, it is preferred that an empty space 113 between the speakers S1 and S2 is preferably filled with an insulating material such as rubber for preventing resonance of sound, so as to form a resonance blocker 115.

The barrier for preventing the sound output from each speaker from propagating toward the other speaker may include either only one partition 111, which is disposed between the speakers S1 and S2 to intercept propagation of the sound, or multiple partitions 111, each of which contacts with a rear end of each of the speakers S1 and S2 to provide an isolated speaker room 112 for each of the speakers S1 and S2. Further, an additional barrier such as a sponge 114 capable of absorbing sound may be provided between the partition 111 and each of the speakers S1 and S2, so as to help prevent the sound output from each speaker from propagating toward the other speaker.

The resonance blocker 115 can prevent the empty space 113 from being formed between the speakers S1 and S2, thereby preventing the sound output from the speakers S1 and S2 from resonating towards each other. Therefore, either the empty space 113 between the speakers S1 and S2 may filled with such material as rubber after housing 10b is made, or housing 10b is molded in a state in which such material as synthetic resin is filled in the space between the speakers. Generation of resonance can be prevented by preventing the empty space 113 from being formed between the speakers S1 and S2, that is, by providing such material as rubber in the empty space 113 after housing 10b is made or by forming a resonance blocker 115 integrally with housing 10b using the same synthetic resin as that of housing 10b. When the resonance blocker 115 is formed integrally with housing 10b, the speakers S1 and S2 are disposed at both sides of the resonance blocker 115. Further, when the resonance blocker 115 is formed integrally with housing 10b, no separate isolated speaker room 112 is necessary.

As described above, a portable terminal according to the present invention includes a pair of side speakers, which are opposite to each other and disposed beside a pair of side hinge arms arranged along a hinge axis A. Therefore, the portable terminal can provide stereo sound to a user of the terminal. Further, barriers such as partitions are formed between the speakers and/or such material as rubber is filled in an empty space between the speakers, so as to prevent the sound output from the speakers from interfering or resonating each other. In addition, a speaker cover for each speaker has openings which enable the output of the speaker to propagate, so as to provide users with the natural sound of the speaker with its original tone.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A portable terminal comprising:
   a phone body having a plurality of keys and a microphone, which are disposed on an inner surface of the phone body;
   a folder having a main speaker and a main LCD, which are disposed on an inner surface of the folder;
   a hinge unit including a pair of side hinge arms and a center hinge arm, which enable the folder to be rotated away from or towards the phone body, the side hinge arms being opposed to each other, the center hinge arm being disposed between the side hinge arms;
   a pair of side speakers provided at the side hinge arms, respectively, the side speakers being oriented in opposite directions along a hinge axis of the portable terminal; and
   speaker covers arranged along the hinge axis to cover the side speakers, respectively, each of the speaker covers having at least one opening through which one of the side speakers is exposed,
   wherein each of the speaker covers is fixed to one of the side hinge arms by a first screw and a second screw, so as to cover an outer surface of said one of the side hinge arms, the first screw being screwed in a direction parallel to the hinge axis, the second screw being screwed into said one of the side hinge arms from an upper end of the hinge body in a direction perpendicular to the hinge axis.

2. The portable terminal as claimed in claim 1, wherein:
   a speaker cover hole is formed through a side surface of each of the side hinge arms;
   at least one stopper protrudes from a boundary surface defining the speaker cover hole;
   at least one assembling rib is formed on a peripheral portion of an inner surface of each of the speaker covers so that the assembling rib can contact the boundary surface; and
   a stopper hole formed through the assembling rib so that the stopper can be engaged with the stopper hole.

3. The portable terminal as claimed in claim 1, wherein:
   a first assembling bracket extending in a direction parallel to the hinge axis from an inner surface of each of the speaker covers and has a first assembling hole formed through the first assembling bracket in a direction perpendicular to the hinge axis;
   a second assembling bracket formed inside of each of the side hinge arms so that the second assembling bracket can contact the first assembling bracket, the second assembling bracket having a second assembling hole formed through the second assembling bracket;

a second screw hole formed through each of the side hinge arms in a direction perpendicular to the hinge axis from an upper surface of each of the side hinge arms; and the first assembling hole, the second assembling hole, and the second screw hole are aligned with each other, and a second screw is screwed sequentially through the second screw hole, the first assembling hole, and the second assembling hole in a direction perpendicular to the hinge axis.

4. The portable terminal as claimed in claim 1, wherein each of the speaker covers has a convex shape.

5. The portable terminal as claimed in claim 1, wherein the center hinge arm is formed integrally with the folder and has a center key disposed on a surface connected to an inner surface of the folder.

6. The portable terminal as claimed in claim 1, wherein the side hinge arms have grooves formed on upper surfaces of the side hinge arms, respectively, so that corners of a shoulder of the folder can be seated in the grooves when the folder has been closed on the phone body.

7. The portable terminal as claimed in claim 1, further comprising a sub LCD disposed on the outer surface of the folder.

8. The portable terminal as claimed in claim 1, further comprising a camera lens provided at a location of the center hinge arm, which is adjacent to an outer surface of the folder.

9. The portable terminal as claimed in claim 1, wherein each of the speaker covers further has a cap covering on the opening of the speaker cover and having pores formed through the cap.

10. A portable terminal comprising:
a phone body having a pair of side hinge arms laterally protruding at one side of the phone body;
a folder having a center hinge arm disposed between the side hinge arms;
a pair of side speakers provided at the side hinge arms and oriented in opposite directions along a hinge axis of the portable terminal;
speaker covers arranged along the hinge axis to cover the side speakers, respectively, each of the speaker covers having at least one opening through which one of the side speakers is exposed;
at least one cap covering on the opening of one of the speaker covers and having pores formed through the cap; and
a camera lens provided at a location on the center hinge arm, which is adjacent to an outer surface of the folder, wherein each of the speaker covers is fixed to one of the side hinge arms by a first screw and a second screw, so as to cover an outer surface of said one of the side hinge arms, the first screw being screwed in a direction parallel to the hinge axis, the second screw being screwed into said one of the side hinge arms from an upper end of the hinge body in a direction perpendicular to the hinge axis.

11. A portable terminal comprising:
a phone body having a plurality of keys and a microphone, which are disposed on an inner surface of the phone body;
a folder having a main speaker and a main LCD, which are disposed on an inner surface of the folder;
a hinge unit connecting the phone body with the folder in such a manner to enable the folder to be rotated away from or towards the phone body;
a pair of side speakers installed in a pair of side hinge arms which are formed at opposite ends of one side of the phone body, the side speakers being oriented in opposite directions along a hinge axis of the portable terminal;
a barrier disposed behind the side speakers to prevent sound emitted from the side speakers from interfering with each other;
speaker covers arranged along the hinge axis to cover the side speakers, respectively, each of the speaker covers having at least one opening through which one of the side speakers is exposed; and
at least one cap covering on the opening of one of the speaker covers and having pores formed through the cap,
wherein each of the speaker covers is fixed to one of the side hinge arms by a first screw and a second screw, so as to cover an outer surface of said one of the side hinge arms, the first screw being screwed in a direction parallel to the hinge axis, the second screw being screwed into said one of the side hinge arms from an upper end of the hinge body in a direction perpendicular to the hinge axis.

12. The portable terminal as claimed in claim 11, wherein the barrier comprises at least one partition disposed between the side speakers.

13. The portable terminal as claimed in claim 12, wherein the barrier comprises partitions, which contact with rear surfaces of the side speakers, respectively.

14. The portable terminal as claimed in claim 12, wherein the barrier further comprises sponge disposed between the partition and each of the side speakers.

15. A portable terminal comprising:
a phone body having a plurality of keys and a microphone, which are disposed on an inner surface of the phone body;
a folder having a main speaker and a main LCD, which are disposed on an inner surface of the folder;
a hinge unit connecting the phone body with the folder to enable the folder to be rotated away from or towards the phone body;
a pair of side speakers installed in a pair of side hinge arms which are formed at opposite ends of one side of the phone body, the side speakers being spaced apart from each other and being oriented in opposite directions along a hinge axis of the portable terminal; and
a resonance blocker located between the side speakers to prevent sound emitted from the side speakers from resonating with each other.

16. The portable terminal as claimed in claim 15, wherein the resonance blocker comprises rubber filled between the side speakers.

17. The portable terminal as claimed in claim 15, wherein the resonance blocker is formed integrally with an inner surface of a housing of the phone body and the side speakers are disposed at both sides of the resonance blocker.

18. A portable terminal comprising:
a phone body having a plurality of keys and a microphone, which are disposed on an inner surface of the phone body;
a folder having a main speaker and a main LCD, which are disposed on an inner surface of the folder;
a hinge unit connecting the phone body with the folder in such a manner to enable the folder to be rotated away from or towards the phone body;
a pair of side speakers installed in a pair of side hinge arms which are formed at opposite ends of one side of the phone body, the side speakers being spaced apart from each other and being oriented in opposite directions along a hinge axis of the portable terminal;

speaker covers assembled with outer surfaces of the side hinge arms to cover the side speakers, respectively, so as to enable sound emitted from the side speakers to naturally propagate an original tone of the sound; and a resonance blocker located between the side speakers to prevent the formation of empty space between the side speakers and thereby prevent sound emitted from the side speakers from resonating with each other.

19. The portable terminal as claimed in claim 18, wherein each of the speaker covers has at least one first opening aligned with each of the side speakers and at least one second opening extending along a circumference of said each of the speakers.

20. The portable terminal as claimed in claim 18, wherein each of the speaker covers has at least one first opening aligned with each of the side speakers and at least one second opening extending around a circumference of the first opening.

21. The portable terminal as claimed in claim 18, further comprising caps, wherein:

each of the speaker covering has at least one first opening aligned with each of the side speakers and at least one second opening extending around a circumference of the first opening to correspond to a circumference of said each of the speakers;

each of the caps is covered on the first opening and the second opening and having a plurality of pores; and the second opening serves as an assembling portion with which the cap is engaged.

* * * * *